(12) United States Patent
Woo et al.

(10) Patent No.: US 11,040,522 B2
(45) Date of Patent: Jun. 22, 2021

(54) POLYIMIDE COVER SUBSTRATE

(71) Applicant: KOLON INDUSTRIES, INC., Gwacheon-si (KR)

(72) Inventors: Hak Yong Woo, Yongin-si (KR); Hak Gee Jung, Yongin-si (KR); Ki Il Hong, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 295 days.

(21) Appl. No.: 14/781,829

(22) PCT Filed: Mar. 31, 2014

(86) PCT No.: PCT/KR2014/002733
§ 371 (c)(1),
(2) Date: Oct. 1, 2015

(87) PCT Pub. No.: WO2014/163352
PCT Pub. Date: Oct. 9, 2014

(65) Prior Publication Data
US 2016/0040027 A1    Feb. 11, 2016

(30) Foreign Application Priority Data

Apr. 2, 2013  (KR) ........................ 10-2013-0035605

(51) Int. Cl.
*B32B 27/20*    (2006.01)
*B32B 27/28*    (2006.01)

(52) U.S. Cl.
CPC ............ *B32B 27/20* (2013.01); *B32B 27/281* (2013.01); *B32B 2255/10* (2013.01);
(Continued)

(58) Field of Classification Search
CPC ............. B32B 27/20; B32B 2262/101; B32B 2457/20; B32B 2457/206; B32B 5/024;
(Continued)

(56) References Cited

U.S. PATENT DOCUMENTS

2002/0113241 A1* 8/2002 Kubota ............... H01L 51/5253
257/79
2004/0086717 A1  5/2004 Sasaki et al.
(Continued)

FOREIGN PATENT DOCUMENTS

JP    2006-297737 A    11/2006
JP    2007-130995 A     5/2007
(Continued)

OTHER PUBLICATIONS

International Searching Authority, International Search Report of PCT/KR2014/002733, dated Jul. 7, 2014. [PCT/ISA/210].
(Continued)

*Primary Examiner* — John D Freeman
(74) *Attorney, Agent, or Firm* — Sughrue Mion, PLLC (57) ABSTRACT

Disclosed is a polyimide cover substrate, which is configured such that a device protection layer is formed of a urethane acrylate compound on at least one side of a polyimide film, thereby exhibiting not only high flexural properties and impact resistance but also superior solvent resistance, optical properties and scratch resistance and low water vapor transmission rate, and thus can be effectively utilized as a cover substrate for a flexible electronic device.

11 Claims, 2 Drawing Sheets

(52) U.S. Cl.
 CPC ....... *B32B 2255/20* (2013.01); *B32B 2255/26* (2013.01); *B32B 2255/28* (2013.01); *B32B 2262/101* (2013.01); *B32B 2457/20* (2013.01); *B32B 2457/206* (2013.01); *Y10T 428/31721* (2015.04)

(58) Field of Classification Search
 CPC ....... B32B 9/005; B32B 9/047; B32B 27/281; B32B 2255/26; B32B 2255/28; B32B 2255/10; B32B 2255/20; Y10T 428/31721
 See application file for complete search history.

(56) References Cited

U.S. PATENT DOCUMENTS

| | | | |
|---|---|---|---|
| 2005/0112378 A1* | 5/2005 | Naruse | B32B 27/08 428/412 |
| 2006/0134400 A1* | 6/2006 | Takada | C08G 18/672 428/313.9 |
| 2006/0286371 A1† | 12/2006 | Kim | |
| 2009/0056981 A1 | 3/2009 | Maeda et al. | |
| 2010/0165460 A1* | 7/2010 | Furui | G02B 1/105 359/488.01 |
| 2011/0143132 A1 | 6/2011 | Jung et al. | |
| 2012/0292084 A1 | 11/2012 | Lai et al. | |

FOREIGN PATENT DOCUMENTS

| | | | | |
|---|---|---|---|---|
| JP | 2009-218034 A | | 9/2009 | |
| KR | 10-2005-0067037 A | † | 6/2005 | |
| KR | 10-2011-0000195 A | | 1/2011 | |
| KR | 10-2012-0078514 A | † | 7/2012 | |
| KR | 10-2013-0007238 A | † | 1/2013 | |
| WO | WO-2014003211 A1 | * | 1/2014 | ................ C08J 7/06 |

OTHER PUBLICATIONS

Japanese Patent Office; Communication dated Nov. 8, 2016 in counterpart application N. 2016-505413.

\* cited by examiner
† cited by third party

POLYIMIDE COVER SUBSTRATE

CROSS REFERENCE TO RELATED APPLICATIONS

This application is a National Stage of International Application No. PCT/KR2014/002733 filed Mar. 31, 2014, claiming priority based on Korean Patent Application No. 10-2013-0035605, filed Apr. 2, 2013, the contents of all of which are incorporated herein by reference in their entirety.

TECHNICAL FIELD

The present invention relates to a polyimide cover substrate, which is useful as a cover substrate in flexible electronic devices.

BACKGROUND ART

Recently as next-generation electronic display devices which may be flexed or bent, flexible electronic devices are receiving attention and are exemplified by flexible photoelectronic devices including flexible OLED, lightweight displays, flexible sealants, color EPD, plastic LCD, TSP, OPV, etc. In order to achieve flexible type displays which may be bent or flexed and to protect a substructure, a new type of flexible cover substrate is required in lieu of a conventional glass cover substrate. Furthermore, such a substrate has to maintain high hardness, low water vapor transmission rate, superior chemical resistance and optical transmittance to protect parts provided in display devices.

A material for the cover substrate for a flexible display may include a variety of high-hardness plastic substrates. Especially, a transparent polyimide film which may attain high hardness at low thickness is considered to be the main candidate for an alternative substrate material.

A film, which is under study as the material for a cover substrate for a flexible electronic device, has been manufactured in such a manner that an acryl- or epoxy-based organic cured film is formed on the surface of a transparent film to enhance hardness, but such an organic cured film is not flexible, undesirably causing surface cracking problems in the evaluation of flexural properties or impact resistance.

DISCLOSURE

Technical Problem

Accordingly, the present invention has been made keeping in mind the above problems occurring in the related art, and an object of the present invention is to provide a transparent polyimide cover substrate useful as a cover substrate for a flexible electronic device, which has superior flexural properties and impact resistance.

Technical Solution

In order to accomplish the above object, an embodiment of the present invention provides a polyimide cover substrate, comprising a polyimide film; and a device protection layer formed of a urethane acrylate compound on at least one side of the polyimide film.

In a preferred embodiment of the present invention, the urethane acrylate compound is a urethane acrylate compound represented by Chemical Formula 1 below:

<Chemical Formula 1> wherein R is each independently a benzene group, an alkylbenzene group having 1 to 5 carbon atoms, an alkoxybenzene group having 1 to 5 carbon atoms, a cyclohexane group, an alkylcyclohexane group having 1 to 5 carbon atoms, a diphenylmethane group, a diphenylethane group, a dicyclohexylmethane group or an alkyl group having 1 to 10 carbon atoms.

In a preferred embodiment of the present invention, the urethane acrylate compound has a weight average molecular weight of 1,000~50,000 g/mol.

In a preferred embodiment of the present invention, the device protection layer has a thickness of 1.0~30 μm.

In a preferred embodiment of the present invention, the polyimide cover substrate further comprises one or more selected from the group consisting of a silicon oxide layer, a hard coating layer and a transparent electrode layer.

In a preferred embodiment of the present invention, the polyimide cover substrate is configured such that the device protection layer, the transparent electrode layer, the silicon oxide layer, the polyimide film, the silicon oxide layer and the hard coating layer are sequentially stacked.

In a preferred embodiment of the present invention, the polyimide cover substrate is configured such that the device protection layer, the transparent electrode layer, the silicon oxide layer, the polyimide film, the silicon oxide layer, the transparent electrode layer and the hard coating layer are sequentially stacked.

In a preferred embodiment of the present invention, the polyimide cover substrate is configured such that the silicon oxide layer, the polyimide film, the silicon oxide layer, the transparent electrode layer, the device protection layer, the transparent electrode layer and the hard coating layer are sequentially stacked.

In a preferred embodiment of the present invention, the polyimide cover substrate is configured such that the device protection layer, the silicon oxide layer, the polyimide film, the silicon oxide layer, the transparent electrode layer, the device protection layer, the transparent electrode layer and the hard coating layer are sequentially stacked.

In a preferred embodiment of the present invention, the polyimide cover substrate is configured such that the transparent electrode layer, the device protection layer, the silicon oxide layer, the polyimide film, the silicon oxide layer and the hard coating layer are sequentially stacked.

In a preferred embodiment of the present invention, the polyimide cover substrate is configured such that the device protection layer, the hard coating layer, the transparent electrode layer, the silicon oxide layer, the polyimide film, the silicon oxide layer, the transparent electrode layer, the hard coating layer and the device protection layer are sequentially stacked.

In a preferred embodiment of the present invention, the polyimide cover substrate is configured such that the device protection layer, the hard coating layer, the transparent electrode layer, the silicon oxide layer, the polyimide film, the silicon oxide layer, the transparent electrode layer and the hard coating layer are sequentially stacked.

In a preferred embodiment of the present invention, the silicon oxide layer includes silicon oxide comprising a unit structure represented by Chemical Formula 2 below:

<Chemical Formula 2> wherein m and n are each independently an integer of 0~10.

In a preferred embodiment of the present invention, the silicon oxide layer has a thickness of 0.3~2.0 μm.

In a preferred embodiment of the present invention, the hard coating layer includes a compound represented by Chemical Formula 4 below:

<Chemical Formula 4> wherein X is (wherein n is an integer of 0~5, m is an integer of 1~5, and $R_1$ is an alkyl group having 1 to 10 carbon atoms or a hydrogen atom), and $R_2$ is an alkyl group having 1 to 10 carbon atoms.

In a preferred embodiment of the present invention, the hard coating layer has a thickness of 1.0~20.0 μm.

In a preferred embodiment of the present invention, the hard coating layer contains one or more selected from the group consisting of indium-tin oxide (ITO), indium-zinc oxide (IZO) and indium-tin-zinc oxide (ITZO), and has a thickness of 10~50 nm.

Advantageous Effects

According to the present invention, a transparent polyimide cover substrate can be provided, which has not only high flexural properties and impact resistance but also superior solvent resistance, optical properties and scratch resistance and low water vapor transmission rate, and such a transparent polyimide cover substrate can be efficiently utilized as a cover substrate for a flexible display.

MODE FOR INVENTION

Unless otherwise defined, all the technical and scientific terms used herein have the same meanings as those typically understood by those skilled in the art to which the present invention belongs. Generally, the nomenclature used herein is well known in the art and is typical.

As used herein, when any part "includes" or "contains" any element, this means that another element is not excluded but may be further included unless otherwise specifically mentioned.

Throughout the specification, when any element is included at "one side" of another element, this means that any element may be formed on one surface of another element or may be located on the same side as another element, wherein the case where it is located on the same side as another element indicates that a further element may be provided between any element and another element.

The present invention addresses a polyimide cover substrate, comprising a polyimide film; and a device protection layer formed of a urethane acrylate compound on at least one side of the polyimide film.

Below is a detailed description of the present invention.

According to the present invention, the polyimide cover substrate is configured such that the device protection layer is formed of a urethane acrylate compound on at least one side of the polyimide film.

The polyimide film is typically obtained by subjecting a diamine and an acid dianhydride to polymerization and then imidization. The polyimide film of the invention may be used without limitation so long as it is a colorless transparent film without yellow while having inherent heat resistance of a polyimide resin. Preferably useful is a polyimide film having an average transmittance of 85% or more measured at 350~700 nm using a UV spectrophotometer based on a film thickness of 10~100 μm, a yellow index of 15 or less, and an average coefficient of thermal expansion (CTE) of 50.0 ppm/° C. or less measured at 50~250° C. using a TMA-method.

If the average transmittance based on a film thickness of 10~100 μm is less than 85% or the yellow index exceeds 15, transparency may decrease, making it impossible to apply the corresponding film to displays or optical devices. Also, if CTE exceeds 50.0 ppm/° C., a difference in CTE from the plastic substrate may increase, undesirably causing a short circuit when the device is overheated or is at high temperature.

The urethane acrylate compound is an acrylate copolymer, and is preferably a urethane acrylate represented by Chemical Formula 1 below, with a weight average molecular weight of 1,000~50,000 g/mol, and 1~10 average urethane bonds per molecule in terms of maintaining elasticity of a coating layer and appropriate hardness to protect a substructure.

<Chemical Formula 1>

In Chemical Formula 1, R is each independently a benzene group, an alkylbenzene group having 1 to 5 carbon atoms, an alkoxybenzene group having 1 to 5 carbon atoms, a cyclohexane group, an alkylcyclohexane group having 1 to 5 carbon atoms, a diphenylmethane group, a diphenylethane group, a dicyclohexylmethane group or an alkyl group having 1 to 10 carbon atoms.

If the weight average molecular weight of the urethane acrylate compound represented by Chemical Formula 1 is less than 1,000 g/mol, cracking may occur upon folding. In contrast, if it exceeds 50,000 g/mol, elasticity may decrease, and thus hardness and device protection capability may deteriorate.

As such, the molecular weight in the above range was determined by measuring polystyrene-converted weight average molecular weight using gel permeation chromatography (GPC) (Waters E2695). The polymer to be measured was dissolved to a concentration of 1 wt % in tetrahydrofuran and then fed in an amount of 20 μl in GPC. The mobile phase of GPC was tetrahydrofuran, and fed at a flow rate of 1 mL/min, and analysis was performed at 40° C. Two Plgel mixed D columns and one Plgel guard column were connected in serial. The detector was Waters 2414 RI detector.

The urethane acrylate compound has high elasticity and flexibility and may be included in a device protection layer on one or both sides of the polyimide film, thereby maintaining superior properties of the polyimide film and improving impact resistance and flexural properties of the substrate.

The device protection layer formed of the urethane acrylate compound preferably has a thickness of 1.0~30 μm. The thickness of the device protection layer may be set to 1 μm or more to ensure superior impact resistance and flexural properties compared to the substrate film, and may be set to 30 μm or less to prevent deterioration of optical properties of the polyimide cover substrate and curling thereof.

The device protection layer according to the present invention may be obtained by applying a urethane acrylate-containing solution on a polyimide film or a specific layer and then performing drying and curing. As such, the urethane acrylate-containing solution is prepared by using 15~80 wt % of the urethane acrylate compound relative to the total wt % of the solution in terms of uniform coating and thickness control.

The device protection layer may be formed from the urethane acrylate-containing solution using any process appropriately selected from among spraying, bar coating, spin coating, dip coating, etc.

The curing process may be implemented through UV curing. In consideration thereof, a photoinitiator may be added to the urethane acrylate-containing solution. An example of the photoinitiator may include a benzoin ether photoinitiator, a benzophenone photoinitiator or a combination thereof. UV curing may be executed by irradiating UV light at wavelengths of 312 and/or 365 nm in a dose of 500~10,000 J/m². If curing is performed under conditions less than the range specified, sufficient elasticity cannot be ensured. In contrast, if curing is performed under conditions exceeding the range specified, cracking may occur.

Also, the polyimide cover substrate according to the present invention may further include one or more selected from the group consisting of a silicon oxide layer, a hard coating layer and a transparent electrode layer, depending on the end use.

The silicon oxide layer is added to improve solvent resistance and high heat resistance of the polyimide cover substrate, and contains silicon oxide comprising a unit structure of Chemical Formula 2 below.

<Chemical Formula 2>

In Chemical Formula 2, m and n are each independently an integer of 0~10. In the case where n or m in Chemical Formula 2 is zero, a pure inorganic layer is provided and thus solvent resistance and high heat resistance may be maximized. In some cases, to improve flexibility of a polyimide film, an alkyl chain having an appropriate length where n or m in Chemical Formula 1 is a natural number of 1 or more is favorable. When n or m is 10 or more, a coating solution may agglomerate upon coating due to hydrophobicity.

As such, the silicon oxide layer preferably has a thickness of 0.3~2.0 μm. The thickness thereof may be set to 0.3 μm or more to sufficiently ensure proper solvent resistance, and may be set to 2.0 μm or less to exclude a concern of decreasing flexibility of the polyimide substrate.

The polyimide cover substrate according to the present invention, including the silicon oxide layer, is favorable in terms of high transmittance, low yellow index and low water vapor transmission rate. Low water vapor transmission rate is essential to protect TFT and OLED from external wet conditions.

Also, when the polyimide cover substrate according to the present invention is configured such that the silicon oxide layer is formed on the surface of the polyimide film, the surface roughness (RMS) thereof may be 2 nm or less, resulting in flatness of the substrate. Because of such flatness, carriers may be easily moved upon forming electrodes or TFT.

The formation of the silicon oxide layer on one or both surfaces of the polyimide cover substrate according to the present invention may include applying a polysilazane solution on one or both surfaces of the polyimide film and drying it, and curing the coated polysilazane.

Specifically, the silicon oxide layer is formed on at least one surface of the polyimide film in such a manner that polysilazane is applied and cured, and thereby the —NH— group of the unit structure of Chemical Formula 3 below may be converted into the —O— group of the unit structure of Chemical Formula 2 to form the silicon oxide layer. As such, curing is preferably performed through thermal curing at 200~300° C.

<Chemical Formula 3>

In Chemical Formula 3, m and n are each an integer of 0~10.

Such a thermal curing process facilitates the formation of a network structure necessary for obtaining the silicon oxide layer from polysilazane, and enables the film to become rigid, thus exhibiting excellent chemical resistance and heat resistance.

In the case where a thermal curing process is adopted, the coated polysilazane may be thermally treated at 200~300° C. As such, when the thermal treatment temperature is 200° C. or more, the period of time required to cure polysilazane into a silicon oxide layer may be shortened. When it is 300° C. or less, distortion due to a difference in CTE between the polyimide film and the silicon oxide layer may be prevented.

PECVD or sputtering which is a conventional deposition process for forming an inorganic material on the surface of a film is disadvantageous because of limitation of vacuum equipment to thus cause a restricted deposition area. However, the method of applying the solution and curing it into an inorganic material according to the present invention may be implemented through a simple casting process at atmospheric pressure, and is very advantageous in a large area and continuous process.

As such, polysilazane includes a unit structure of Chemical Formula 3, with a weight average molecular weight of 1,000~5,000 g/mol.

In Chemical Formula 3, m and n may be appropriately selected depending on the properties of a final silicon oxide. When the weight average molecular weight of polysilazane is set to 1,000 g/mol or more, higher solvent resistance and heat resistance may be ensured, and when it is set to 5,000 g/mol or less, uniform coatability of the solution may be ensured.

Applying the solution including polysilazane on one or both surfaces of the transparent polyimide film may be performed using any process appropriately selected from among spraying, bar boating, spin coating, dip coating, etc.

Meanwhile, the hard coating layer functions to enhance scratch resistance of the cover substrate, and may contain a polyisocyanate compound represented by Chemical Formula 4 below.

<Chemical Formula 4>

In Chemical Formula 4, X is (wherein n is an integer of 0~5, m is an integer of 1~5, and $R_1$ is an alkyl group having 1 to 10 carbon atoms or a hydrogen atom), and $R_2$ is an alkyl group having 1 to 10 carbon atoms.

The polyisocyanate compound is an organic compound having a plurality of isocyanate groups in a molecule, and the number of isocyanate groups contained in a polyisocyanate compound molecule is preferably 5 or less.

The polyisocyanate compound may react with an acrylic resin having a hydroxyl group, giving a polyisocyanate compound containing an acrylate group. The polyisocyanate compound containing an acrylate group is able to form a crosslinked structure able to improve physical properties of a coating film upon curing. In the polyisocyanate compound containing an acrylate group, when the number of isocyanate groups is 5 or more, hardness may become desirable but the film may stiffen due to high crosslinkability, and thus flexural properties which are regarded as important in a flexible cover substrate may deteriorate.

Examples of the polyisocyanate compound having two isocyanate groups in a molecule may include diisocyanate monomers such as tolylene diisocyanate, naphthalene diisocyanate, xylylene diisocyanate, and norbornene diisocyanate, and such diisocyanate monomers may react with an acrylic resin having a hydroxyl group, thus forming a diisocyanate compound containing an acrylate group. Alternatively, an example of the polyisocyanate compound containing an acrylate group, obtained by reacting a polyisocyanate compound having three or more isocyanate groups in a molecule with an acrylic resin having a hydroxyl group, may be a polyisocyanate of Chemical Formula 1.

The hard coating layer of polyisocyanate containing an acrylate group preferably has a thickness of 1.0~20.0 μm. The thickness of the hard coating layer may be set to 1 μm or more to ensure a pencil hardness of H or more compared to the substrate film, and may be set to 20.0 μm or less to exclude a reduction in flexibility of the transparent polyimide substrate.

The hard coating layer of polyisocyanate containing an acrylate group may be obtained by applying the solution including polyisocyanate containing an acrylate group on the transparent polyimide film and performing drying and curing.

Applying the solution including polyisocyanate containing an acrylate group on one or both surfaces of the transparent polyimide film may be performed using any process appropriately selected from among spraying, bar coating, spin coating, dip coating, etc.

Curing of the hard coating layer is carried out through UV curing. In consideration thereof, a photoinitiator may be added to the solution including acrylate. An example of the photoinitiator may include a benzoin ether photoinitiator, a benzophenone photoinitiator, or a combination thereof. UV curing may be performed by irradiating UV light at wavelengths of 312 and/or 365 nm in a dose of 500~10,000 J/m².

Meanwhile, the transparent electrode layer contains a transparent conductive material selected from among indium-tin oxide (ITO), indium-zinc oxide (IZO), indium-tin-zinc oxide (ITZO) and combinations thereof.

The transparent electrode layer using the transparent conductive material may be formed using either chemical vapor deposition (CVD) or sputtering, and the thickness of the transparent electrode layer thus formed is preferably set to 10~50 nm. The thickness of the transparent electrode layer may be set to 20 nm or less to ensure transparency even when resistance is slightly high, and may be set to 30 nm or more to ensure low resistance rather than transparency.

Below is a detailed description of the configuration of the polyimide cover substrate including the polyimide film, the device protection layer, the silicon oxide layer, the hard coating layer and the transparent electrode layer, with reference to the appended drawings.

Figure 1:
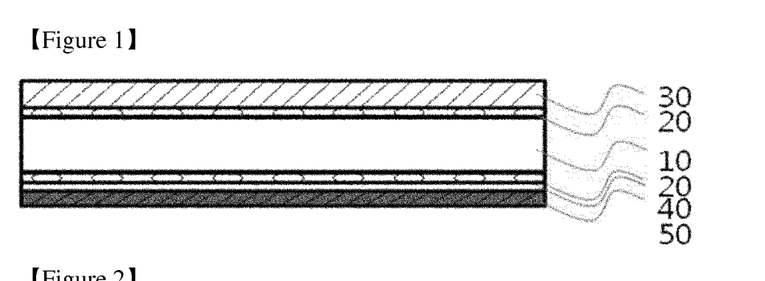
FIG. 1 is a cross-sectional view illustrating a polyimide cover substrate according to a first embodiment of the present invention.

The polyimide cover substrate according to the present invention may be configured such that the device protection layer 50, the transparent electrode layer 40, the silicon oxide layer 20, the polyimide film 10, the silicon oxide layer 20 and the hard coating layer 30 are sequentially stacked (FIG. 1).

Figure 2:
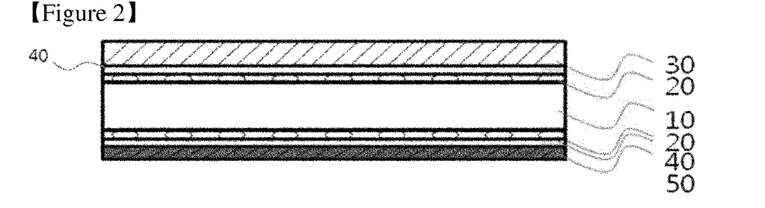
FIG. 2 is a cross-sectional view illustrating a polyimide cover substrate according to a second embodiment of the present invention.

The polyimide cover substrate according to the present invention may be configured such that the device protection layer 50, the transparent electrode layer 40, the silicon oxide layer 20, the polyimide film 10, the silicon oxide layer 20, the transparent electrode layer 40 and the hard coating layer 30 are sequentially stacked (FIG. 2).

Figure 3:
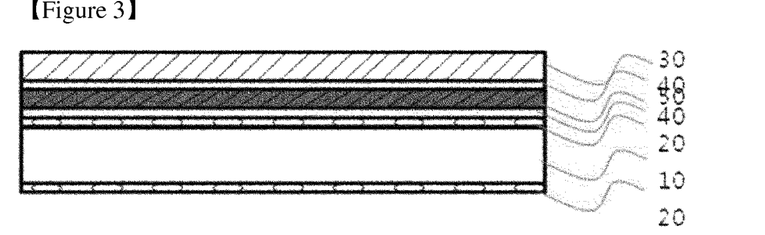
FIG. 3 is a cross-sectional view illustrating a polyimide cover substrate according to a third embodiment of the present invention.

The polyimide cover substrate according to the present invention may be configured such that the silicon oxide layer 20, the polyimide film 10, the silicon oxide layer 20, the transparent electrode layer 40, the device protection layer 50, the transparent electrode layer 40 and the hard coating layer 30 are sequentially stacked (FIG. 3).

Figure 4:
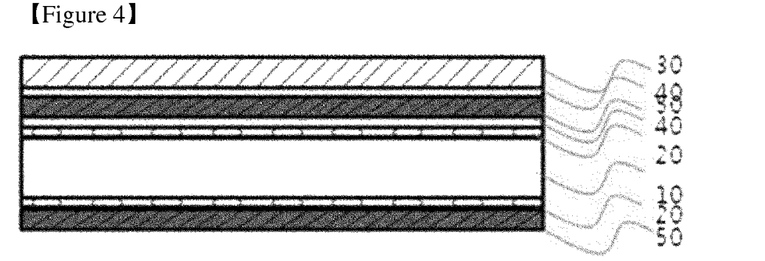
FIG. 4 is a cross-sectional view illustrating a polyimide cover substrate according to a fourth embodiment of the present invention.

The polyimide cover substrate according to the present invention may be configured such that the device protection layer 50, the silicon oxide layer 20, the polyimide film 10, the silicon oxide layer 20, the transparent electrode layer 40, the device protection layer 50, the transparent electrode layer 40 and the hard coating layer 30 are sequentially stacked (FIG. 4).

Figure 5:
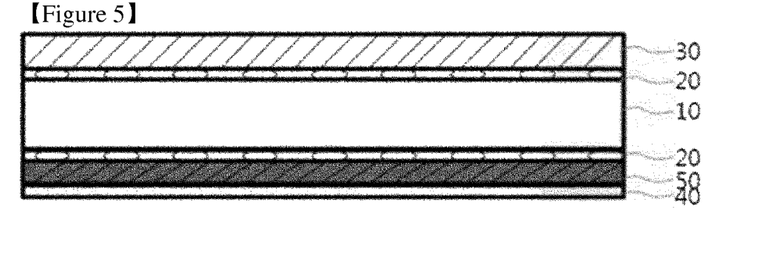
FIG. 5 is a cross-sectional view illustrating a polyimide cover substrate according to a fifth embodiment of the present invention.

The polyimide cover substrate according to the present invention may be configured such that the transparent electrode layer 40, the device protection layer 50, the silicon oxide layer 20, the polyimide film 10, the silicon oxide layer 20 and the hard coating layer 30 are sequentially stacked (FIG. 5).

Figure 6:
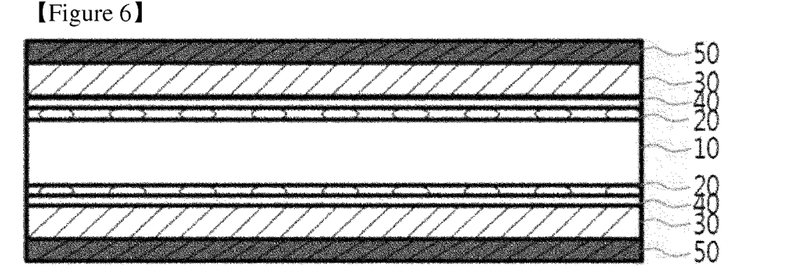
FIG. 6 is a cross-sectional view illustrating a polyimide cover substrate according to a sixth embodiment of the present invention.

The polyimide cover substrate according to the present invention may be configured such that the device protection layer 50, the hard coating layer 30, the transparent electrode layer 40, the silicon oxide layer 20, the polyimide film 10, the silicon oxide layer 20, the transparent electrode layer 40, the hard coating layer 30 and the device protection layer 50 are sequentially stacked (FIG. 6).

Figure 7:
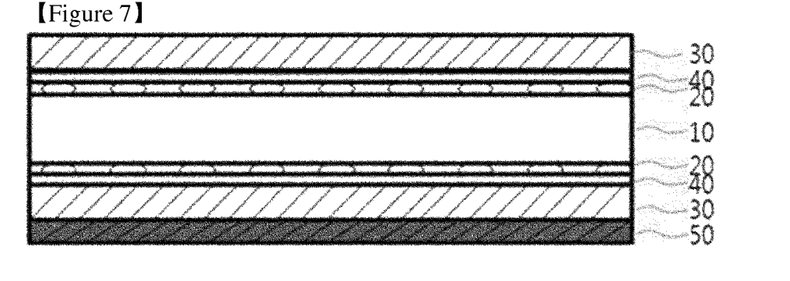
FIG. 7 is a cross-sectional view illustrating a polyimide cover substrate according to a seventh embodiment of the present invention.

The polyimide cover substrate according to the present invention may be configured such that the device protection layer 50, the hard coating layer 30, the transparent electrode layer 40, the silicon oxide layer 20, the polyimide film 10, the silicon oxide layer 20, the transparent electrode layer 40 and the hard coating layer 30 are sequentially stacked (FIG. 7).

A better understanding of the present invention may be obtained through the following examples which are set forth to illustrate, but are not to be construed as limiting the present invention.

Preparation Example 1

1-1: Preparation of Polyimide Powder

While a 1 L reactor equipped with a stirrer, a nitrogen inlet tube, a dropping funnel, a temperature controller and a condenser was purged with nitrogen, 832 g of N,N-dimethylacetamide (DMAc) was placed, the temperature of the reactor was adjusted to 25° C., 64.046 g (0.2 mol) of bistrifluoromethyl benzidine (TFDB) was dissolved, and this solution was maintained at 25° C. 31.09 g (0.07 mol) of 2,2-bis(3,4-dicarboxyphenyl)hexafluoropropane dianhydride (6FDA) and 8.83 g (0.03 mol) of biphenyl tetracarboxylic dianhydride (BPDA) were added, and dissolved and reacted with stirring for a predetermined period of time. The temperature of the solution was maintained at 25° C. 20.302 g (0.1 mol) of terephthaloyl chloride (TPC) was added, thus obtaining a polyamic acid solution having a solid content of 13 wt %. The polyamic acid solution was added with 25.6 g of pyridine and 33.1 g of acetic anhydride, stirred for 30 min, further stirred at 70° C. for 1 hr, cooled to room temperature, and precipitated with 20 L of methanol, after which the precipitated solid was filtered, ground and dried at 100° C. for 6 hr in a vacuum, affording 111 g of polyimide in solid powder form.

1-2: Formation of Polyimide Film 0.03 g (0.03 wt %) of amorphous silica particles having OH group bound to the surface thereof were added to a dispersion concentration of 0.1% to N,N-dimethylacetamide (DMAc), and ultrasonic treatment was performed until the solvent became transparent, followed by dissolving 100 g of polyimide in solid powder form in 670 g of DMAc, thus obtaining a 13 wt % solution. The solution thus obtained was applied on a stainless plate, cast to 340 μm, and dried using hot air at 130° C. for 30 min, after which the resulting film was stripped from the stainless plate and then fixed to a frame with pins. The film-fixed frame was placed in a vacuum oven, slowly heated from 100° C. to 300° C. over 2 hr, and then slowly cooled, and a polyimide film was separated from the frame and then subjected to final thermal treatment at 300° C. for 30 min. The resulting polyimide film had a thickness of 50 μm, an average transmittance of 88%, a yellow index of 3.0, and CTE of 20 ppm/° C. measured at 50~250° C. by a TMA-method.

Comparative Example 1

The polyimide film of Preparation Example 1 was prepared and used as Comparative Example 1.

Comparative Example 2

10 g of polysilazane (OPTS25 20 wt %, AZ MATERIALS) of Chemical Formula 2 in which m and n are 1 with a weight average molecular weight of 2,000 g/mol was dissolved to 10 wt % in 10 mL of dibutylether (DBE), and the resulting solution was applied on one surface of the colorless transparent polyimide film of Comparative Example 1 by means of a wire, and dried at 80° C., thus forming a 0.5 μm thick polysilazane film. Subsequently, this film was allowed to stand at room temperature for about 5 min, and then thermally cured at about 250° C., thus forming a 0.5 μm thick silicon oxide layer, ultimately manufacturing a polyimide cover substrate including the colorless transparent polyimide film and the silicon oxide layer.

Comparative Example 3

10 g of acrylate-containing polyisocyanate (KLS-009 55 wt %, NATOCO) of Chemical Formula 4 in which m and n are 1, $R_1$ is a hexyl group and $R_2$ is a hexyl group was dissolved in 10 mL of PGMEA, and the resulting solution was applied on one surface of the colorless transparent polyimide film of Comparative Example 1 by means of a bar coater, and dried at 80° C., thus forming a 10 μm thick coating film. Subsequently, two wavelengths of 312 nm and 365 nm were simultaneously irradiated at an energy of 100 mW/cm$^2$ for 10 sec using a UV curing machine, thus forming a 10 μm thick hard coating layer, ultimately manufacturing a polyimide cover substrate including the colorless transparent polyimide film and the hard coating layer.

Comparative Example 4

Silicon oxide layers were formed in the same manner as in Comparative Example 2 on both surfaces of the polyimide film of Comparative Example 1, a hard coating layer 10 μm thick was formed in the same manner as in Comparative Example 3 on one of the silicon oxide layers, and ITO was deposited on the other silicon oxide layer by means of a sputter, thus forming a transparent electrode layer 20 nm thick, ultimately manufacturing a polyimide substrate including the transparent electrode layer, the silicon oxide layer, the colorless transparent polyimide film, the silicon oxide layer and the hard coating layer, which were sequentially stacked.

Example 1

Silicon oxide layers were formed in the same manner as in Comparative Example 2 on both surfaces of the colorless transparent polyimide film, and the acrylate-containing polyisocyanate solution used in Comparative Example 3 was applied, dried and cured in the same manner as in Comparative Example 3 on one of the silicon oxide layers, thus forming a hard coating layer 10 μm thick. Then, ITO was deposited on the other silicon oxide layer opposite the hard coating layer using a sputter, thus forming a transparent electrode layer. 10 g of a urethane acrylate compound (KLH-100, NATOCO) having a weight average molecular weight of 8,000 g/mol and represented by Chemical Formula 1 in which R is a hexyl group was dissolved in 10 g of methylethylketone (MEK), and then the resulting solution having the dissolved urethane acrylate compound was applied on the transparent electrode layer by means of a bar coater and then dried at 80° C., thus obtaining a coating film 10 μm thick. Then, two wavelengths of 312 nm and 365 nm were simultaneously irradiated on the coating film at an energy of 100 mW/cm$^2$ for 10 sec using a UV curing machine, thus forming a 10 μm thick device protection layer, ultimately manufacturing a polyimide cover substrate (FIG. 1) including the device protection layer, the transparent electrode layer, the silicon oxide layer, the polyimide film, the silicon oxide layer and the hard coating layer, which were sequentially stacked.

Example 2

In the same manner as in Example 1, silicon oxide layers were formed on both surfaces of the polyimide film, and transparent electrode layers were formed on outer surfaces of the silicon oxide layers. Also, a hard coating layer was formed on one of the transparent electrode layers, and a device protection layer was formed on the other transparent electrode layer opposite the hard coating layer, thereby manufacturing a polyimide cover substrate (FIG. 2) including the device protection layer, the transparent electrode layer, the silicon oxide layer, the polyimide film, the silicon oxide layer, the transparent electrode layer and the hard coating layer, which were sequentially stacked.

Example 3

In the same manner as in Example 1, silicon oxide layers were formed on both surfaces of the polyimide film, after which a transparent electrode layer was formed on one of the silicon oxide layers, and a device protection layer was formed on the transparent electrode layer. Further, a transparent electrode layer was formed on the device protection layer, and a hard coating layer was formed on the transparent electrode layer, thereby manufacturing a polyimide cover substrate (FIG. 3) including the silicon oxide layer, the polyimide film, the silicon oxide layer, the transparent electrode layer, the device protection layer, the transparent electrode layer and the hard coating layer, which were sequentially stacked.

Example 4

In the same manner as in Example 1, silicon oxide layers were formed on both surfaces of the polyimide film, after which a device protection layer was formed on one of the silicon oxide layers, and a transparent electrode layer was formed on the other silicon oxide layer opposite the device protection layer. Further, a device protection layer was formed on the transparent electrode layer, a transparent electrode layer was formed on the device protection layer, and a hard coating layer was formed on the transparent electrode layer, thereby manufacturing a polyimide cover substrate (FIG. 4) including the device protection layer, the silicon oxide layer, the polyimide film, the silicon oxide layer, the transparent electrode layer, the device protection layer, the transparent electrode layer and the hard coating layer, which were sequentially stacked.

Example 5

In the same manner as in Example 1, silicon oxide layers were formed on both surfaces of the polyimide film, a device protection layer was formed on one of the silicon oxide layers, and a transparent electrode layer was formed on the device protection layer. Further, a hard coating layer was formed on the other silicon oxide layer opposite the transparent electrode layer, thereby manufacturing a polyimide cover substrate (FIG. 5) including the transparent electrode layer, the device protection layer, the silicon oxide layer, the polyimide film, the silicon oxide layer and the hard coating layer, which were sequentially stacked.

Example 6

In the same manner as in Example 1, silicon oxide layers were formed on both surfaces of the polyimide film, transparent electrode layers were formed on outer surfaces of the silicon oxide layers, and hard coating layers were formed on outer surfaces of the transparent electrode layers. Further, device protection layers were formed on outer surfaces of the hard coating layers, thereby manufacturing a polyimide cover substrate (FIG. 6) including the device protection layer, the hard coating layer, the transparent electrode layer, the silicon oxide layer, the polyimide film, the silicon oxide layer, the transparent electrode layer, the hard coating layer and the device protection layer, which were sequentially stacked.

Example 7

In the same manner as in Example 1, silicon oxide layers were formed on both surfaces of the polyimide film, transparent electrode layers were formed on outer surfaces of the silicon oxide layers, and hard coating layers were formed on outer surfaces of the transparent electrode layers. Further, a device protection layer was formed on one of the hard coating layers, thereby manufacturing a polyimide cover substrate (FIG. 7) including the device protection layer, the hard coating layer, the transparent electrode layer, the silicon oxide layer, the polyimide film, the silicon oxide layer, the transparent electrode layer and the hard coating layer, which were sequentially stacked.

<Evaluation of Properties>

The properties of the polyimide cover substrates were measured through the following procedures. The results are shown in Tables 1 and 2 below.

(1) Measurement of Average Transmittance (%)

An optical transmittance of each polyimide cover substrate was measured at 350~700 nm using a spectrophotometer (CU-3700D, KONICA MINOLTA).

(2) Measurement of Yellow Index

A yellow index of each polyimide cover substrate was measured using a spectrophotometer (CU-3700D, KONICA MINOLTA).

(3) Measurement of Water Vapor Transmission Rate ($g/m^2$*Day)

A water vapor transmission rate (WVTR) of each polyimide cover substrate was measured using a water vapor transmission tester (MOCON/US/Aquatran-model-1).

(4) Measurement of Pencil Hardness

A line 50 mm long was drawn five times on each polyimide cover substrate with a Mitsubishi test pencil (UNI) at a rate of 180 mm/min under a load of 1 kg using an electric pencil hardness tester, after which pencil hardness was measured when there was no surface scratch.

(5) Measurement of Adhesion

According to a standard test method (ASTM D3359), each polyimide cover substrate was cross-cut, and taped and then measured.

(6) Measurement of Flexural Properties

Each polyimide cover substrate was wound and unwound 10,000 times on and from a cylinder having a diameter of 10 mm, and cracking of the film was observed with the naked eye and using a microscope. The case where any crack is present is represented by 'Failed', and the case where no crack is present is represented by 'OK'.

(7) Measurement of Scratch Resistance

Each polyimide cover substrate was rubbed back and forth 500 times with steelwool at a 100 mm length at a rate of 50 mm/sec under a load of 500 g, after which the number of scratches was counted with the naked eye and using an optical microscope. The case where no scratch is present is represented by 'o', the case where the number of scratches is less than 1~5 is represented by 'Δ', and the case where the number of scratches is 5 or more is represented by 'X'.

(8) Measurement of Impact Resistance

Each polyimide cover substrate was placed on 0.7T glass and a ball was dropped at a height of 50 cm from the glass, and damage and cracking of the glass were observed with the naked eye and using an optical microscope. The case where any one fine crack is present is represented by 'Failed', and the case where no fine crack is present is represented by 'OK'.

(9) Measurement of Chemical Resistance

Each polyimide cover substrate was dipped into 2.38% tetramethylammonium hydroxide (TMAH), dimethylacetamide (DMAc), N-methyl-2-pyrrolidone (NMP), 1% potassium hydroxide (KOH), acetone, isopropyl alcohol (IPA), methylethylketone (MEK) and $NaSO_2$ (sodium sulfate) for 1 hr, and then observed with the naked eye. The case where cloudiness or abnormal phenomenon occurs is represented by 'X', and the case where a weight change after drying is within 0.01% is represented by 'o'.

TABLE 1

| No. | Transmit (%) | Yellow | WVTR ($g/m^2$/day) | Pencil Hardness (1 kg · 180 mm/min) | Adhesion | Flexural (Curvature Radius 10 mm) | Scratch Resistance | Impact Resistance |
|---|---|---|---|---|---|---|---|---|
| Ex. 1 | 88 | 3.0 | 0.1 | 6H | 5B | OK | ○ | OK |
| Ex. 2 | 86 | 4.3 | 0.07 | 6H | 5B | OK | ○ | OK |
| Ex. 3 | 86 | 4.5 | 0.06 | 6H | 5B | OK | ○ | OK |
| Ex. 4 | 85 | 4.8 | 0.009 | 7H | 5B | OK | ○ | OK |
| Ex. 5 | 88 | 3.2 | 0.3 | 7H | 5B | OK | ○ | OK |
| Ex. 6 | 84 | 4.7 | 0.006 | 6H | 5B | OK | ○ | OK |
| Ex. 7 | 85 | 5.1 | 0.009 | 7H | 5B | OK | ○ | OK |
| C. Ex. 1 | 89 | 2.5 | >50 | H | — | OK | X | Failed |
| C. Ex. 2 | 91 | 1.5 | >50 | 2H | 5B | OK | X | Failed |
| C. Ex. 3 | 88 | 3.2 | >50 | 6H | 5B | Failed | ○ | Failed |
| C. Ex. 4 | 88 | 3.3 | 0.1 | 6H | 5B | Failed | ○ | Failed |

TABLE 2

| No. | TMAH | DMAc | NMP | KOH | Acetone | MEK | IPA | $NaSO_2$ |
|---|---|---|---|---|---|---|---|---|
| Ex. 1 | ○ | ○ | ○ | ○ | ○ | ○ | ○ | ○ |
| Ex. 2 | ○ | ○ | ○ | ○ | ○ | ○ | ○ | ○ |
| Ex. 3 | ○ | ○ | ○ | ○ | ○ | ○ | ○ | ○ |
| Ex. 4 | ○ | ○ | ○ | ○ | ○ | ○ | ○ | ○ |
| Ex. 5 | ○ | ○ | ○ | ○ | ○ | ○ | ○ | ○ |
| Ex. 6 | ○ | ○ | ○ | ○ | ○ | ○ | ○ | ○ |
| Ex. 7 | ○ | ○ | ○ | ○ | ○ | ○ | ○ | ○ |
| C. Ex. 1 | ○ | X | X | X | X | X | ○ | X |
| C. Ex. 2 | ○ | ○ | ○ | ○ | ○ | ○ | ○ | ○ |

TABLE 2-continued

| No. | TMAH | DMAc | NMP | KOH | Acetone | MEK | IPA | NaSO$_2$ |
|---|---|---|---|---|---|---|---|---|
| C. Ex. 3 | ○ | ○ | ○ | ○ | ○ | ○ | ○ | ○ |
| C. Ex. 4 | ○ | ○ | ○ | ○ | ○ | ○ | ○ | ○ |

As is apparent from Table 1, compared to Comparative Example 1 without any surface treatment, in Comparative Example 2 where the silicon oxide layer is formed on the surface of the polyimide film, optical transmittance and yellow index were improved, and in Comparative Example 3 where the hard coating layer is formed on the surface of the polyimide film, scratch resistance and pencil hardness were improved.

In Examples 1 to 7 including the device protection layer, flexural properties and impact resistance were improved compared to Comparative Example 4 without the device protection layer, and exhibited a yellow index of 5 or less and a transmittance of 85% or more adapted for use in optical electronic devices, with satisfactory water vapor transmission rate, pencil hardness, adhesion, flexural properties, scratch resistance, impact resistance and chemical resistance, compared to Comparative Example 1 without any surface treatment.

Therefore, the polyimide cover substrate according to the present invention can be effectively utilized as a cover substrate for a flexible electronic device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polyimide cover substrate, comprising:
a polyimide film,
a first protection layer,
a first silicon oxide layer,
a second silicon oxide layer,
a first transparent electrode layer, and
a first hard coating layer,
wherein the polyimide film has an average transmittance of 85% or more measured at 350-700 nm using a UV spectrophotometer based on a film thickness of 10-100 µm, a yellow index of 15 or less, and an average coefficient of thermal expansion (CTE) of 50.0 ppm/°C. or less measured at 50-250° C. using a TMA-method, and
wherein the first protection layer is formed of a urethane acrylate compound and has a thickness of 10-30 µm, and
wherein the first silicon oxide layer has a surface roughness (RMS) of 2 nm or less, and the first silicon oxide layer includes silicon oxide which has a network structure comprising a repeating unit structure of the following Chemical Formula 2, and
wherein the second silicon oxide layer has a surface roughness (RMS) of 2 nm or less, and the second silicon oxide layer includes silicon oxide which has a network structure comprising a repeating unit structure of the following Chemical Formula 2, and
wherein the polyimide cover substrate is configured such that the first protection layer, the first transparent electrode layer, the first silicon oxide layer, the polyimide film, the second silicon oxide layer, and the first hard coating layer are sequentially stacked:

<Chemical Formula 2> wherein m and n are each independently an integer of 1-10.

2. The polyimide cover substrate of claim 1, wherein the polyimide cover substrate further comprises a second transparent electrode layer, and
wherein the polyimide cover substrate is configured such that the first protection layer, the first transparent electrode layer, the first silicon oxide layer, the polyimide film, the second silicon oxide layer, the second transparent electrode layer, and the first hard coating layer are sequentially stacked.

3. A polyimide cover substrate, comprising:
a polyimide film,
a first protection layer,
a first silicon oxide layer,
a second silicon oxide layer,
a first transparent electrode layer, a second transparent electrode layer, and
a first hard coating layer,
wherein the polyimide film has an average transmittance of 85% or more measured at 350-700 nm using a UV spectrophotometer based on a film thickness of 10-100 µm, a yellow index of 15 or less, and an average coefficient of thermal expansion (CTE) of 50.0 ppm/°C. or less measured at 50-250° C. using a TMA-method, and
wherein the first protection layer is formed of a urethane acrylate compound and has a thickness of 10-30 µm, and
wherein the first silicon oxide layer has a surface roughness (RMS) of 2 nm or less, and the first silicon oxide layer includes silicon oxide which has a network structure comprising a repeating unit structure of the following Chemical Formula 2, and
wherein the second silicon oxide layer has a surface roughness (RMS) of 2 nm or less, and the second silicon oxide layer includes silicon oxide which has a network structure comprising a repeating unit structure of the following Chemical Formula 2, and
wherein the polyimide cover substrate is configured such that the first silicon oxide layer, the polyimide film, the second silicon oxide layer, the first transparent electrode layer, the first protection layer, the second transparent electrode layer, and the first hard coating layer are sequentially stacked:

Chemical Formula 2 wherein m and n are each independently an integer of 1-10.

4. The polyimide cover substrate of claim 3, wherein the polyimide cover substrate further comprises a second protection layer, and
wherein the second protection layer is formed of a urethane acrylate compound, and wherein the polyimide cover substrate is configured such that the second protection layer, the first silicon oxide layer, the polyimide film, the second silicon oxide layer, the first transparent electrode layer, the device protection layer, the first transparent electrode layer, and the first hard coating layer are sequentially stacked.

5. A polyimide cover substrate, comprising:
a polyimide film,
a first protection layer,
a first silicon oxide layer,
a second silicon oxide layer,
a first transparent electrode layer, and
a first hard coating layer,
wherein the polyimide film has an average transmittance of 85% or more measured at 350-700 nm using a UV spectrophotometer based on a film thickness of 10-100 µm, a yellow index of 15 or less, and an average coefficient of thermal expansion (CTE) of 50.0 ppm/° C. or less measured at 50-250° C. using a TMA-method, and
wherein the first protection layer is formed of a urethane acrylate compound and has a thickness of 10-30 µm, and
wherein the first silicon oxide layer has a surface roughness (RMS) of 2 nm or less, and the first silicon oxide layer includes silicon oxide which has a network structure comprising a repeating unit structure of the following Chemical Formula 2, and
wherein the second silicon oxide layer has a surface roughness (RMS) of 2 nm or less, and the second silicon oxide layer includes silicon oxide which has a network structure comprising a repeating unit structure of the following Chemical Formula 2, and
wherein the polyimide cover substrate is configured such that the first transparent electrode layer, the first protection layer, the first silicon oxide layer, the polyimide film, the second silicon oxide layer, and the first hard coating layer are sequentially stacked:

Chemical Formula 2 wherein m and n are each independently an integer of 1-10.

6. The polyimide cover substrate of claim 1, wherein the polyimide cover substrate further comprises a second transparent electrode layer, a second hard coating layer and a second protection layer, and
wherein the second protection layer is formed of a urethane acrylate compound, and wherein the polyimide cover substrate is configured such that the first protection layer, the second hard coating layer, the first transparent electrode layer, the first silicon oxide layer, the polyimide film, the second silicon oxide layer, the second transparent electrode layer, the first hard coating layer, and the second protection layer are sequentially stacked.

7. The polyimide cover substrate of claim 1, wherein the polyimide cover substrate further comprises a second transparent electrode layer and a second hard coating layer, and
wherein the polyimide cover substrate is configured such that the first protection layer, the second hard coating layer, the first transparent electrode layer, the first silicon oxide layer, the polyimide film, the second silicon oxide layer, the second transparent electrode layer, and the first hard coating layer are sequentially stacked.

8. The polyimide cover substrate of claim 1, wherein the first silicon oxide layer has a thickness of 0.3-2.0 µm.

9. The polyimide cover substrate of claim 1, wherein the first hard coating layer has a thickness of 1.0-20.0 µm.

10. The polyimide cover substrate of claim 1, wherein the first hard coating layer contains one or more selected from the group consisting of indium-tin oxide, indium-zinc oxide and indium-tin-zinc oxide, and has a thickness of 10-50 nm.

11. The polyimide cover substrate of claim 1, wherein the urethane acrylate compound has a weight average molecular weight of 1,000-50,000 g/mol.

* * * * *